Jan. 30, 1951 D. GREGG 2,539,576
INFLATABLE ICE ELIMINATING APPARATUS
Filed Aug. 28, 1945
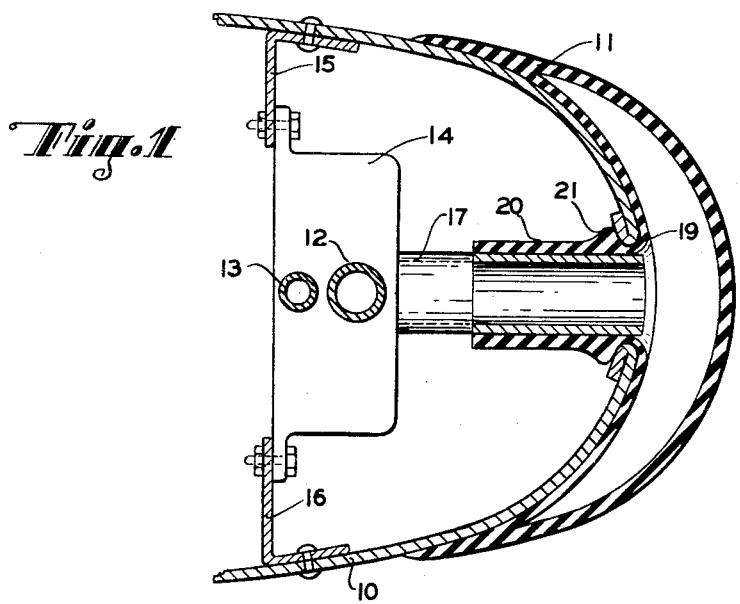
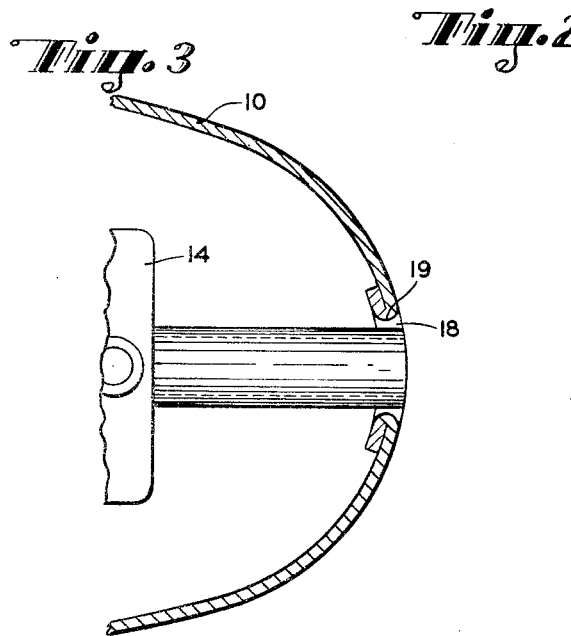
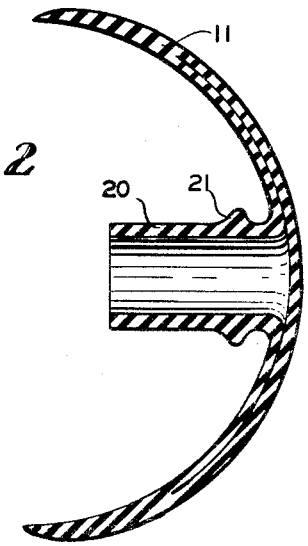
- INVENTOR -
DAVID GREGG
BY Herbert L. Davis Jr.
- ATTORNEY -

Patented Jan. 30, 1951

2,539,576

UNITED STATES PATENT OFFICE 2,539,576

INFLATABLE ICE ELIMINATING APPARATUS

David Gregg, Caldwell, N. J., assignor to Bendix Aviation Corporation, Teterboro, N. J., a corporation of Delaware Application August 28, 1945, Serial No. 613,061

2 Claims. (Cl. 244—134)

The present invention relates to inflatable ice eliminating apparatus and more particularly to novel means for connecting an inflatable ice eliminating boot or boots directly to an air distributor valve through a separable connector.

Heretofore, the air distributor valve has been mounted on the wing span, and connected to the inflatable boots on the leading edge of the wing by a multiplicity of rubber tubes of sufficient length so that the tubes can be drawn through suitable openings in the wing and attached to the boot connections.

The present invention proposes the mounting of an air distributor valve in close proximity to the leading edge of the wing and providing means for connecting the valve directly to the inflatable boot without an intermediate fitting so as to simplify the installation, and reduce the weight and number of fittings required.

An object of the invention is to provide a novel connector means for facilitating the connection between the inflatable boot and the distributor valve.

Another object of the invention is to provide a novel self-sealing connector between the boot and distributor.

Another object of the invention is to provide a simplified arrangement for connecting the distributor and inflatable boot, including a plug projecting from the distributor valve and through an opening in the leading edge of the wing. The opening in the wing being so arranged as to provide a receptacle for receiving a novel socket plug formed on the inflatable boot. The socket plug in turn being so arranged as to receive therein the distributor plug so as to form a self-sealing separable connector between the boot and distributor.

Another object of the invention is to provide a compact boot-distributor connector assembly of such simplicity in construction as to adapt it for manufacture and installation at low cost.

These and other objects and features of the invention are pointed out in the following description in terms of the embodiment thereof which is shown in the accompanying drawings. It is to be understood, however, that the drawings are for the purpose of illustration only and are not designed as a definition of the limits of the invention, reference being had to the appended claims for this purpose.

In the drawings:

Figure 1 is a view showing a connector assembly constructed in accordance with the invention and showing the boot in a partially inflated condition, parts being broken away and in section and the connector being shown in an engaged condition;

Figure 2 is a sectional view showing the boot and socket plug;

Figure 3 is a sectional view of the wing showing the distributor plug with the boot and socket plug removed.

Referring to Figures 1 to 3 of the drawings, there is shown an airfoil 10, such as an airplane wing to which there is attached at the leading edge an inflatable covering or boot 11 formed of elastic rubber-like material suitably reinforced and secured upon the wing 10 or other airfoil.

The boot 11 may be inflated by a fluid medium such as air under pressure and supplied through a main supply line 12 so as to prevent the accumulation of ice as described in the copending application Serial No. 498,248 filed August 11, 1943, by Donald M. Lawrence, David Gregg, and Myron L. Taylor, now Patent No. 2,515,519 issued July 18, 1950.

There is further provided a source of suction through a line 13 for maintaining the boot 11 in a deflated condition. The lines 12 and 13 are connected to a main distributor valve 14 suspended in the wing 10 in close proximity to the leading edge by brackets 15 and 16.

Leading from the distributor valve 14 and formed integral therewith is a tubular plug 17 which projects into an opening 18 formed in the leading edge of the wing 10. The opening 18 has a beading formed about the contour thereof and the tubular plug 17 is positioned in spaced relation thereto.

The distributor valve 14 which may be controlled electrically as shown in the aforenoted copending application, is arranged so as to selectively control the application of pressure, exhaust, and suction to the boot 11 through the tubular plug 17.

The boot 11 formed preferably of a resilient rubber or other rubber-like material has formed as a part thereof a resilient socket plug 20. The socket plug 20 is adapted to be inserted into the opening 18 and has formed thereon a beaded portion 21 to engage the beaded portion 19 as shown in Figure 1. In the assembled condition there also projects into the resilient socket plug 20 the distributor plug 17 so as to form a self-sealing connection between the boot 11 and the distributor valve 14 through the plug 17 and socket plug 20. The resilient socket plug 20 is arranged so as to elastically grip the plug 17.

It will be readily seen from Figure 1, that the inflating pressure acting upon the resilient socket plug 20 will further tend to retain the connection at the beading 19 and thereby maintain the plug 17 in sealed relation with the boot 11.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In an aircraft, the combination comprising an inflatable rubber-like ice eliminating unit carried externally upon a leading edge of an airfoil surface of said aircraft, said leading edge having an opening therein defined by a rigid beading, an air distributing device mounted within said airfoil surface, a first tubular plug formed integral with said device and projecting into said opening in spaced relation to said beading, a second tubular plug formed of an elastic rubber-like material and integral with said unit, said second tubular plug projecting into said opening and receiving said first tubular plug therein, said second tubular plug elastically gripping said first tubular plug, a resilient beading formed on said second tubular plug and engaging the beading defining said opening under wedging force of said first plug so as to secure said second tubular plug in position.

2. In an aircraft, the combination comprising an airfoil surface on said aircraft having an opening therein defined by a beading, an inflatable rubber-like ice eliminating boot located externally upon said airfoil surface, a tubular plug formed of an elastic rubber-like material and integral with said boot, a beading formed on said tubular plug and engaging the beading defining said opening, an air distributing device mounted within said airfoil surface, and another tubular plug formed integral with said device and wedged into said first-mentioned plug and deforming said first-mentioned plug so as to lock said beadings in engaging relation and secure said first-mentioned plug in said opening, said first-mentioned tubular plug elastically gripping said other tubular plug in sealing relation.

DAVID GREGG.

REFERENCES CITED

The following references are of record in the file of this patent:

UNITED STATES PATENTS

| Number | Name | Date |
|---|---|---|
| 2,069,849 | Rich | Feb. 9, 1937 |
| 2,362,675 | Stebbins | Nov. 14, 1944 |
| 2,363,592 | Hunter | Nov. 28, 1944 |